July 8, 1969 S. GHOSH 3,454,890

NEGATIVE FEEDBACK AMPLIFIER HAVING ADJUSTABLE GAIN

Filed Aug. 18, 1967

3,454,890
Patented July 8, 1969

3,454,890

NEGATIVE FEEDBACK AMPLIFIER HAVING ADJUSTABLE GAIN

Suhas Ghosh, Rayleigh, England, assignor to International Standard Electric Corporation Filed Aug. 18, 1967, Ser. No. 661,708
Claims priority, application Great Britain, Aug. 23, 1966, 37,644/66
Int. Cl. H03g 3/30
U.S. Cl. 330—17 9 Claims

ABSTRACT OF THE DISCLOSURE

A negative feedback amplifier the gain of which can be varied over a range of about 60 db by changing one resistance value only and without appreciably altering its frequency characteristics, input and output impedances and the amount of loop feedback.

This invention relates to electrical signal amplifiers provided with negative feedback and having an adjustable gain.

According to the invention there is provided an electrical signal amplifier of adjustable gain including a transistor in a common emitter configuration to which negative feedback is applied by means of a variable resistor in the emitter signal current path of the said transistor, and a transistor in a common base configuration connected in a negative feedback path from the output of the electrical signal amplifier to the emitter of the common emitter circuit transistor.

Figure 1:
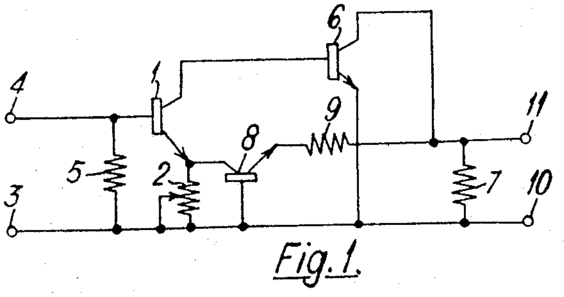
Figure 2:
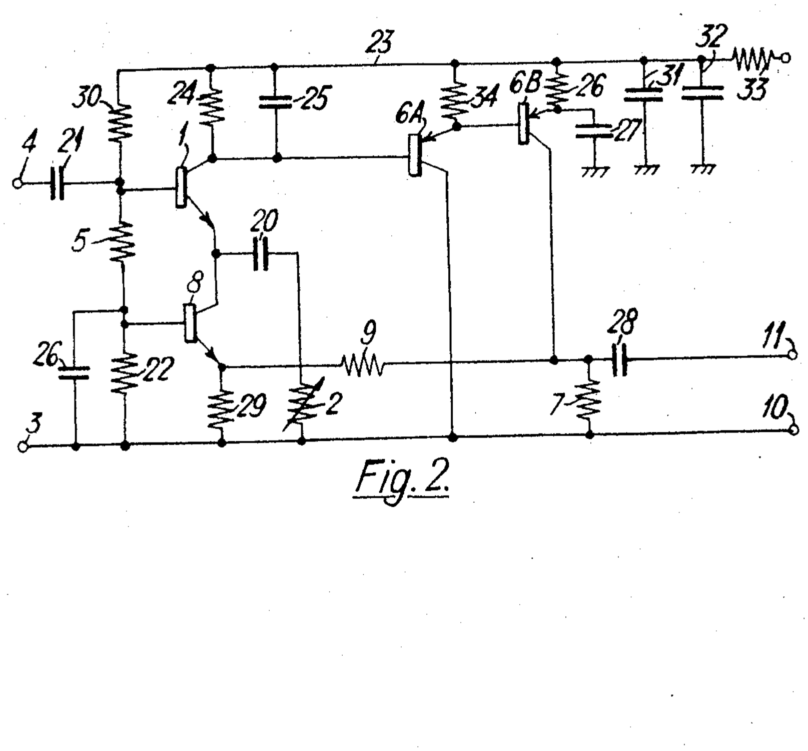

Embodiments of the invention will now be described with reference to the accompanying drawings in which:

FIG. 1 is a diagram of a first embodiment of the invention in an elementary two-stage electrical signal amplifier, and FIG. 2 is a circuit diagram of a more complex three-stage electrical signal amplifier.

Referring to FIG. 1, in which circuit paths carrying D.C. only have been omitted, there is shown a transistor 1 in a common emitter stage in which a variable resistor 2 is inserted between the emitter and a common terminal 3. The input signal to the amplifier is applied between terminals 4 and 3; terminal 4 being connected to the base of the transistor 1. A return current path for the base-emitter circuit of the transistor 1, is provided by a resistor 5 connected between terminals 4 and 3.

The collector of the transistor 1 is connected to the base of a second transistor 6, the emitter of which is connected to the common terminal 3. The collector of the transistor 6 is connected through a load resistor 7 back to the common terminal 3.

A third transistor 8 has its collector connected to the emitter of transistor 1, its base connected to the common terminal 3, and its emitter connected through a series resistor 9 to the collector of the transistor 6. The output from the electrical signal amplifier is obtained from terminals 10 and 11 which are connected to the respective terminals of the load resistor 7. Terminal 10 is also connected to the common terminal 3.

The input signal current applied between terminals 4 and 3 controls the collector signal of the transistor 1 which in turn supplies the base-emitter signal (current) to the transistor 6. The collector current of the transistor 6 is accordingly of opposite phase to the collector current of the transistor 1. The voltage developed across the load resistor 7 is therefore in phase with the collector current of the transistor 1 and with the input signal current applied between terminals 4 and 3. The voltage across the load resistor 7 is the output voltage of the electrical signal amplifier and it is applied via the resistor 9 and the common base transistor stage 8 to the terminals of the variable resistor 2 in series with the emitter of the transistor 1. Since this fed-back voltage produces a current which opposes the emitter current of the transistor 1 resulting from the input signal applied between terminals 4 and 3, the fed-back voltage produces negative current feedback which is additional to that produced by the emitter current of the transistor 1 in the resistor 2.

The effective resistance of the load presented to the collector of the transistor 8 is very much less than the intrinsic collector resistance; the current gain of this common-base transistor stage is therefore close to unity. The current applied from the collector of the transistor 8 to the resistor 2 is accordingly closely equal to that flowing through the resistor 9.

If the effective current gain, $A_i$, from the collector of the transistor 1 to the collector of the transistor 6 is large the overall voltage gain, $A_v$, of the amplifier is given approximately by $$A_v = \frac{R_F}{R_E} \tag{1}$$

where $R_F$ and $R_E$ are the resistance values of the resistors 9 and 2, respectively. If $A_i$ is sufficiently large the overall voltage gain is independent of the value of the amplifier load resistor 7 and the gain of the amplifier can be varied linearly with a variation in $R_E$ alone.

There are practical limits to which $R_E$ can be increased or decreased. As $R_E$ is increased the input impedance between terminals 4 and 3 becomes large and the input signal is shunted by the base-collector impedance of the transistor 1. On the other hand as $R_E$ becomes very small the loop feedback starts to drop and the approximate relationship given by Equation 1 above no longer holds. The closeness of the above approximation to the actual overall gain is dependent upon the extent to which the expression $$\frac{A_i R_L}{R_F + R_L} \text{ is greater than 1}$$

where $R_L$ is the resistance value of the load resistor 7 (assuming the signal source resistance is small).

Provided that the magnitude of $A_i$ is such that the relationship given by Equation 1 is approximately correct the amount of the loop feedback does not alter appreciably with variation in $R_E$ and therefore the frequency response, the input level at which appreciable distortion occurs, and the input and output impedances of the amplifier remain practically unaffected by the variation of the amplifier gain.

The second embodiment of the invention is basically similar to the embodiment just described but it uses transistors of complementary conductivity types so that D.C. as well as A.C. feedback may be provided; additional networks are used to shape the frequency response. Components which fulfil an identical function to corresponding components in FIG. 1 are similarly numbered in FIG. 2.

Referring to FIG. 2, the variable resistor 2 is connected via a capacitor 20 of 2.2 μf. between the emitter of the transistor 1 and the common terminal 3, which is earthed. The input signal to the amplifier is applied between terminals 4 and 3 and reaches the base of transistor 1 via a D.C. blocking capacitor 21 of 0.1 μf. The return current path for the base-emitter circuit of the transistor 1 is provided by the resistors 5 and 30 in parallel, which have values of 10K and 14K, respectively.

The collector of the transistor 1, which is of N-P-N conductivity type, is connected to a positive D.C. supply line through a network comprising a resistor 24 (3K) in parallel with a capacitor 25 (250 $\mu$f.). The negative D.C. supply line is connected to earth.

The collector of the transistor 1 is connected by a D.C. path to the base of a second transistor 6A, which is of P-N-P conductivity type. The transistor 6A is in a common-collector stage, the collector being connected to earth and the emitter to the positive supply line 23 via a resistor 34 of 5.1K.

The emitter of the transistor 6A is connected by a D.C. path to the base of a second P-N-P type transistor 6B in a common emitter stage. The emitter of the transistor 6B is connected to the positive supply line through a resistor 26 of 470 ohms, shunted by a capacitor 27 2.2 $\mu$f. The collector of the transistor 6B is connected to earth through the load resistor 7 of 1K. The live output terminal 11 is connected to the collector of the transistor 6B through a D.C. blocking capacitor 28 of 0.1 $\mu$f. The collector of the transistor 6B is also connected through the resistor 9 (10K) to the emitter of the transistor 8, which is of N-P-N conductivity type. The base of the transistor 8 is connected to the junction of the resistors 5 and 22 and is effectively earthed to signal frequencies by a capacitor 26 of 0.1 $\mu$f. The emitter of the transistor 8 is returned to earth through a resistor 29 of 3K. A resistor 30 of 14K is connected from the positive D.C. supply line 23 to the junction of the resistor 5 with the base of the transistor 1 in order to provide the bases of the transistors 1 and 2 with the correct D.C. operating conditions. Capacitors 31 and 32 are used in combination with a series resistor 33 to decouple the D.C. positive supply line to earth.

The high frequency response characteristic is conformed to the desired shape by the capacitor 25, and the low-frequency cut-off is determined by the capacitors 20 and 27.

The overall gain of the amplifier is given approximately by Equation 1, where $R_F$ and $R_E$ are again the resistance values of the resistors 9 and 2, respectively. The gain of the amplifier is varied by variation of the resistor 2, which is in the emitter current path of the transistor 1.

For large values of $R_E$ (resistor 2) the shunting effect of the output capacitance of the transistor 8 becomes significant and may cause a peak in the high region of the frequency response. In order to obtain a wide operating bandwidth of the amplifier, the transistor 8 is chosen so that its output capacitance is small.

The variation of gain with variation of $R_E$ (resistor 2) is substantially linear over a range 58 db to −6 db, which corresponds to a variation of $R_E$ from 12 ohms to 20K. The frequency range between −3 db points is 5 kc./s. to 5 mc./s.

It is to be understood that the foregoing description of specific examples of this invention is made by way of example only and is not to be considered as a limitation on its scope.

What I claim is:

1. An electrical signal amplifier of variable gain including a transistor in a common emitter configuration to which negative feedback is applied by means of a variable resistor in the emitter signal current path of the said transistor, and a transistor in a common base configuration connected in a negative feedback path from the output of the electrical signal amplifier to the emitter of the common emitter transistor.

2. An electrical signal amplifier as claimed in claim 1 including a resistor in the said negative feedback path, the resistor being connected in series with the emitter of the common base transistor.

3. An electrical signal amplifier as claimed in claim 2 wherein the expression $$\frac{A_i R_L}{R_F + R_L}$$

wherein $A_i$ is the effective current gain of said amplifier, $R_F$ is the resistance of said resistor in said negative feedback path and $R_L$ is the load resistance and the signal source resistance have values such that the overall gain of the electrical signal amplifier varies substantially linearly with variation of the variable resistor in the emitter signal current path of the common emitter transistor.

4. An electrical signal amplifier as claimed in claim 3 including a transistor in a further common emitter configuration of which the base-emitter signal current is obtained from at least a portion of the collector signal current of the first common emitter transistor, and the negative feedback is obtained from the signal voltage across the collector load of the further common emitter circuit transistor.

5. An electrical signal amplifier as claimed in claim 4 wherein the further common emitter circuit transistor is of complementary conductivity type to that of the first common emitter circuit transistor and the base of the further common emitter circuit transistor is connected by a D.C. path to the collector of the first common emitter circuit transistor.

6. An electrical signal amplifier as claimed in claim 5 wherein the base of the further common emitter circuit transistor is connected to the collector of the first common emitter circuit transistor by a D.C. path including the base-emitter path of a transistor in a common collector circuit, the transistor in the common collector circuit having its base connected by a D.C. path to the collector of the first common emitter circuit transistor and being of complementary conductivity type thereto.

7. An electrical signal amplifier as claimed in claim 6 including a capacitor in series with the variable resistor in the emitter signal current path of the first common emitter circuit transistor, the capacitor having a capacitance value such that it produces at least in part a desired low frequency cut-off in the frequency response of the electrical signal amplifier.

8. An electrical signal amplifier as claimed in claim 5 wherein the signal current path of the emitter of the further common emitter circuit transistor is through a capacitor having a capacitance value such that it produces at least in part a desired low frequency cut-off in the frequency response of the electrical signal amplifier.

9. An electrical signal amplifier as claimed in claim 6 wherein the collector of the first common emitter circuit transistor is connected to a D.C. supply through a resistor in parallel with a capacitor, the capacitance value of the capacitor being such that it produces at least in part a desired high frequency cut-off in the frequency response of the electrical signal amplifier.

References Cited

UNITED STATES PATENTS 3,246,251 4/1966 Sheppard ---------- 330—28 X

JOHN KOMINSKI, *Primary Examiner.*

J. B. MULLINS, *Assistant Examiner.*

U.S. Cl. X.R.

330—19, 20, 25, 28, 29